March 1, 1938.　　　　E. E. BENEDICT　　　　2,109,582
BRAKE
Filed April 16, 1936
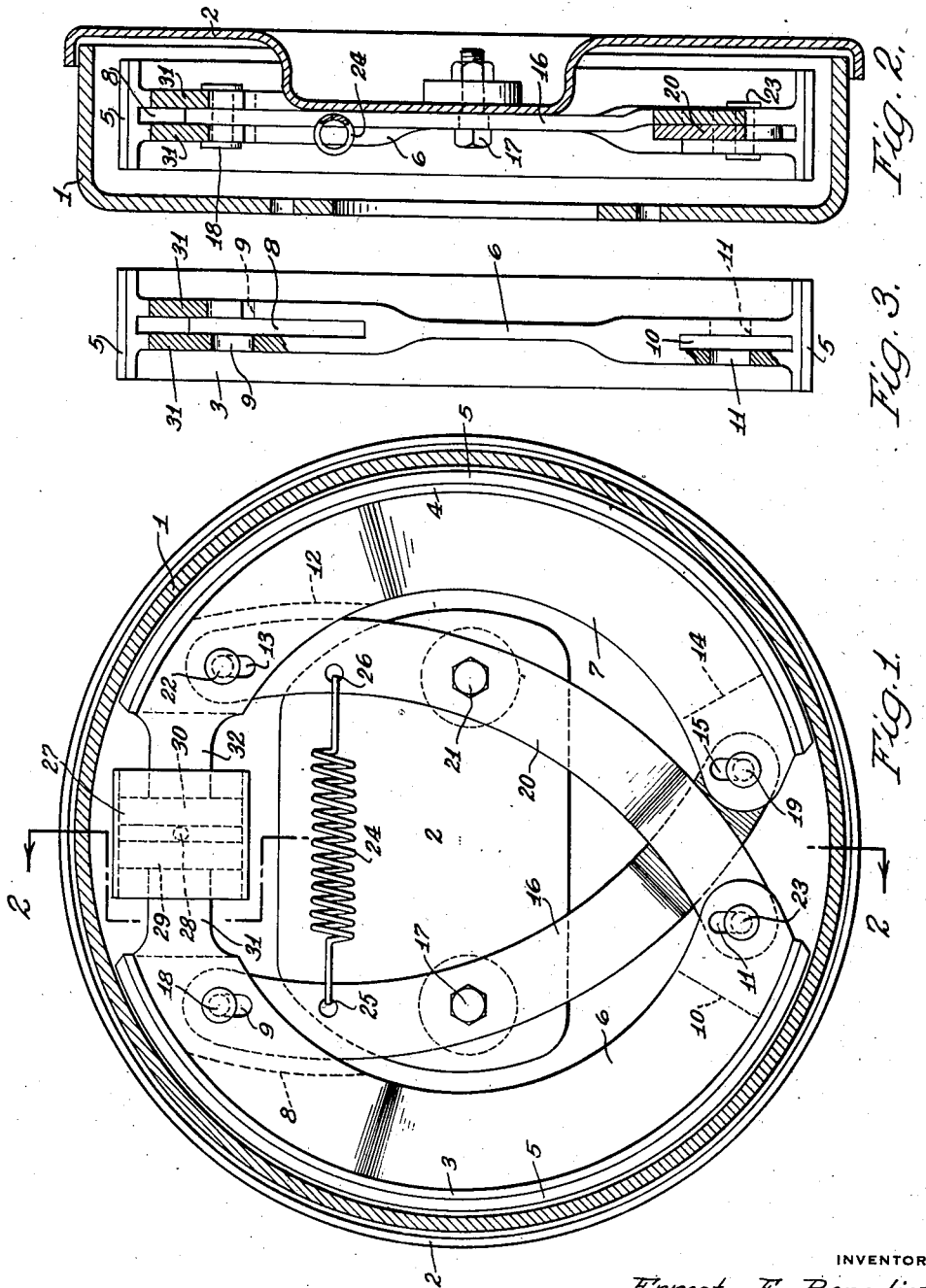
INVENTOR
Ernest E. Benedict
BY
ATTORNEYS Patented Mar. 1, 1938

2,109,582

UNITED STATES PATENT OFFICE 2,109,582

BRAKE

Ernest E. Benedict, Alpena, Mich.

Application April 16, 1936, Serial No. 74,623

5 Claims. (Cl. 188—78)

This invention relates to brake constructions designed particularly for use upon automotive vehicles and embodying radially movable shoes and means for supporting the shoes and moving them into frictional engagement with the brake drum.

The primary object of the present invention is to provide a brake structure wherein shoe supporting and actuating means functions upon actuation thereof to bodily move the shoes outwardly in a radial direction for engagement with the brake drum.

Another object of the present invention is to provide a brake structure wherein shoe supporting and actuating means exerts pressure upon actuation thereof equally on the ends of a pair of brake shoes of segmental form to move said shoes bodily in a radial direction with respect to the brake drum so that the braking action induced by frictional engagement of the shoes with the drum is equally distributed over both shoes.

Another object of the present invention is to provide a brake structure wherein a pair of segmental shoes are supported by actuating means in diametrically opposed relation whereby upon actuation of said actuating means the shoes are moved radially with respect to the drum with which they engage, the said means being connected to the shoes adjacent to their ends and being so constructed that they maintain the shoes in proper relation with respect to the drum and resist the torsional stresses set up by frictional engagement of the shoes with the drum when the latter is rotating which would ordinarily cause uneven wear of the brake lining material.

With the above and other ends in view the invention consists in matters hereinafter more particularly pointed out with reference to the accompanying drawing in which Figure 1 is a vertical section of the brake;

Fig. 2 is a section taken on the line 2—2 of Fig. 1, and

Fig. 3 is an elevation of a brake shoe.

Like characters of reference are employed throughout to designate corresponding parts.

The numeral 1 designates a brake drum adapted to be secured to a vehicle wheel in a manner well known in the art. 2 designates the stationary brake flange adapted to be secured to a stationary part of the vehicle adjacent to the drum as illustrated. Within the drum 1 is a pair of shoes 3 and 4 of segmental form having brake lining material 5 on the outer surfaces thereof. The shoe 3 is provided with a reinforcing web 6 and the shoe 4 with the reinforcing web 7. The web 6 is formed with a groove 8 and a slot 9 adjacent one end thereof and with a groove 10 and slot 11 adjacent the other end. The web 7 has a groove 12 and a slot 13 adjacent one end and a groove 14 and slot 15 adjacent its other end. An arcuate lever 16 is pivotally supported by a pivot pin 17 on the brake flange 2 and has one end extending into the groove 8 and carrying a pin 18 which extends through the slots 9. The other end of the lever 16 extends into the groove 10 14 in the web 7 and carries a pin 19 which extends through the slots 15. A second lever 20 of arcuate form is pivotally attached to the brake flange 2 by a pin 21. One end of the lever 20 extends into the groove 12 and carries a pin 22 which extends into the slots 13 and the other end of the lever 20 extends into the groove 10 and carries a pin 23 which extends into the slots 11. A tension spring 24 has its opposite ends connected to the levers 16 and 20 as designated at 25 and 26.

An actuating means for the brake is shown by way of example and comprises a hydraulic chamber 27 with a fluid inlet 28 and containing pistons 29 and 30. The piston 29 is connected by a rod 31 to the web 6 and the piston 30 is connected by a rod 32 to the web 7.

When fluid under pressure enters the chamber 27 through the port 28 the rods 29 and 30 are forced apart and tend to move the shoes 3 and 4 outwardly with respect to the drum. As the shoes 3 and 4 move outwardly the adjacent ends of levers 16 and 17 are caused to move outwardly and to rock upon their pivots so as to move the other ends of the shoes outwardly an amount equal to the movement caused at the end where the rods 31 and 32 are connected to the shoes. The shoes thus are guided so that they move in a radial direction and by forming the outer surface of the lining material with an arc corresponding to that of the braking surface of the drum 1 the contact between the shoes and the drum will be uniform throughout the entire length of the shoes. The braking action is thus distributed over the entire shoe surface with the result that wear takes place uniformly. Upon relieving the fluid pressure in the port 28 the spring 24 causes the levers 16 and 20 to rock in an opposite direction to carry the shoes out of engagement with the drum.

Although a specific embodiment of the invention has been illustrated and described it will be understood that various changes may be made within the scope of the appended claims without departing from the spirit of the invention and such changes are contemplated.

What I claim is:—

1. In a wheel brake mechanism, a rotatable drum, a stationary support, a pair of shoes adapted for engagement with said drum, a pair of rocking levers, means located on said support on diametrically opposite sides of the axis of said drum and supporting said levers individually for rocking movement, each lever being of greater length on one side of its pivot than on the other side, said levers having their longer portions crossed, means connecting opposite ends of said levers to opposite ends of said shoes, and means acting between adjacent ends of opposed shoes for moving said shoes, the point at which said levers cross being disposed remote from the central zone of the drum and the points at which said levers are pivoted and diametrically opposite from the means for moving said shoes.

2. In a brake mechanism, a rotatable drum, a stationary support, a pair of shoes adapted for engagement with said drum, means for moving said shoes, a pair of rocking levers connected to opposite ends of opposite shoes, pivots mounted on said stationary support on diametrically opposite sides of the axis thereof and individually supporting said levers whereby said levers rock upon movement of said shoes and cause equal straight line movement of opposite ends of said shoes, said pivots permanently securing said levers to said supports, and said shoes being permanently secured to said levers.

3. In a brake mechanism, a rotatable drum, a stationary support, a pair of shoes adapted for engagement with said drum, means for moving said shoes, a pair of rocking levers connected to opposite ends of opposite shoes, pivots mounted on said stationary support on diametrically opposite sides of the axis thereof and individually supporting said levers for rocking movement whereby said levers rock upon movement of said shoes and cause equal straight line movement of opposite ends of said shoes, said stationary support having bearing surfaces adjacent said pivots and engaging said levers to confine movement thereof to a plane transverse of the drum with said plane passing substantially midway between the side edges of said shoes.

4. In a brake mechanism, a rotatable drum, a stationary support, a pair of shoes adapted for engagement with said drum, said shoes having a reinforcing web centrally disposed with respect to the side edges thereof, said webs having grooves in the ends thereof, levers individually pivoted on said stationary support, opposite ends of opposite levers being disposed in the grooves in opposite ends of opposite shoes, slot and pin means securing the ends of said levers in respective slots, said stationary support having bearing surfaces adjacent said pivots and engaging said levers to confine movement thereof to a plane transverse to the drum with said plane passing substantially midway between the side edges of said shoes.

5. In a brake mechanism, a rotatable drum, a stationary support, a pair of shoes adapted for engagement with said drum, means for moving said shoes, a pair of rocking levers connected to opposite ends of opposite shoes, pivots mounted on said stationary support on diametrically opposite sides of the axis thereof and individually supporting said levers for rocking movement whereby said levers rock upon movement of said shoes and cause equal straight line movement of opposite ends of said shoes, said stationary support having a disk-like form and being disposed outwardly of the drum whereby it provides a closure therefor, the portion of said support in which the pivots are mounted being formed to extend inwardly of the drum to dispose said pivots substantially in the mid plane of the drum.

ERNEST E. BENEDICT.